United States Patent [19]

Jackson

[11] 4,366,429
[45] Dec. 28, 1982

[54] VARIABLE SPEED CONTROLLER WITH IMPROVED EFFICIENCY OF ENERGY TRANSFER FOR AN AC INDUCTION MOTOR

[75] Inventor: Robert D. Jackson, Lilburn, Ga.

[73] Assignee: HPS, Inc., Atlanta, Ga.

[21] Appl. No.: 160,918

[22] Filed: Jun. 19, 1980

[51] Int. Cl.³ .............................................. H02P 5/40
[52] U.S. Cl. .................................... 318/811; 318/798; 318/806; 318/714
[58] Field of Search ................ 318/811, 714, 798, 806

[56] References Cited

U.S. PATENT DOCUMENTS 3,662,247  5/1972  Schieman ............................ 318/808
3,967,173  6/1976  Stich ................................... 318/811

*Primary Examiner*—David Smith, Jr.

*Attorney, Agent, or Firm*—Thomas A. Turner, Jr.; Seymour A. Scholnick

[57] ABSTRACT

A variable speed controller for an alternating current induction motor reestablishes the start time for firing pulses and clock pulses in a circuit having a uniform frequency generator generating firing and clock pulses. Feedback from the stator terminals sets an oscillator with a sawtooth type ramp output. Subsequent feedback from the stator terminals are compared with the output of the oscillator in a comparator that establishes a time or phase shift in the generated output having the same frequency, for resetting the firing pulses so that the frequency of current to the stator winding is a function of the relationship between the stator and rotor positions, and of the current amplitude in the stator windings. Adjustment of the circuit parameters reduces the difference between the rotor and stator positions and optimizes stator current to maintain flux balance.

1 Claim, 8 Drawing Figures

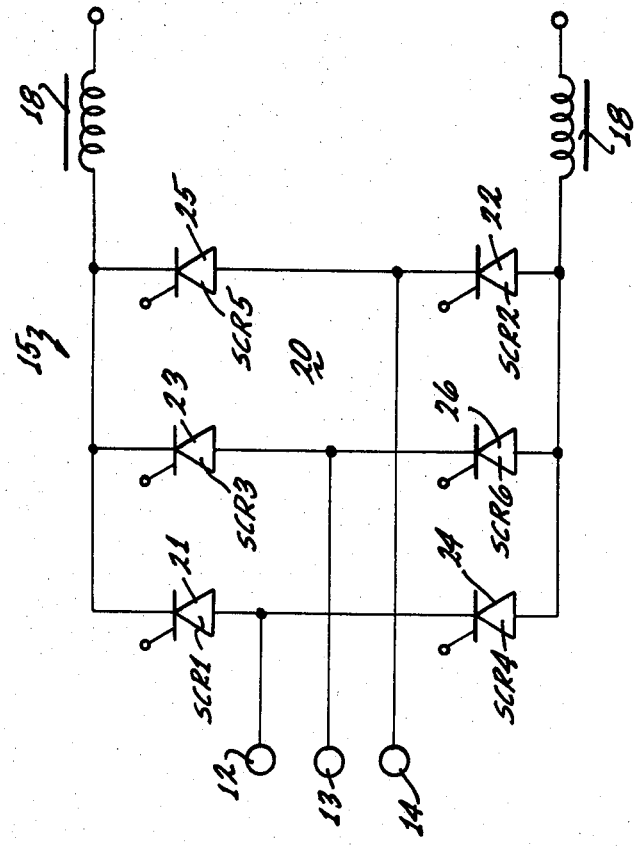
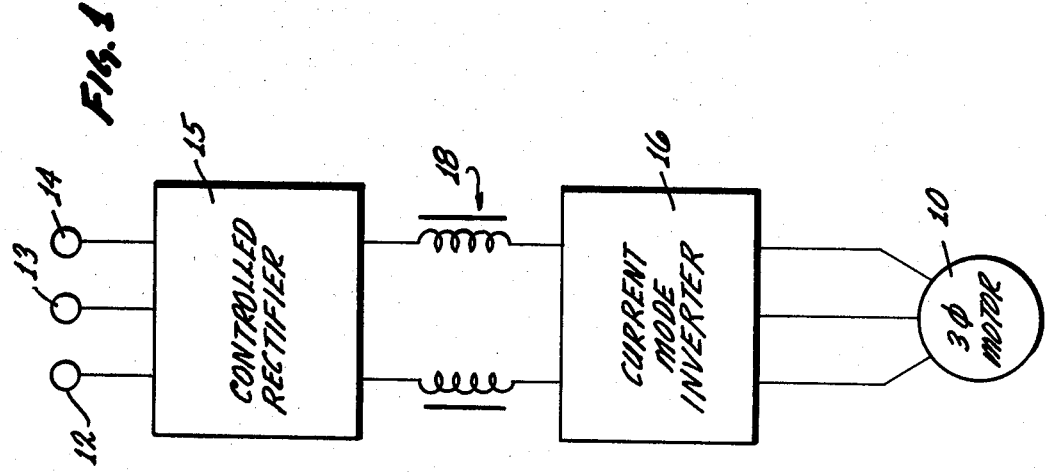

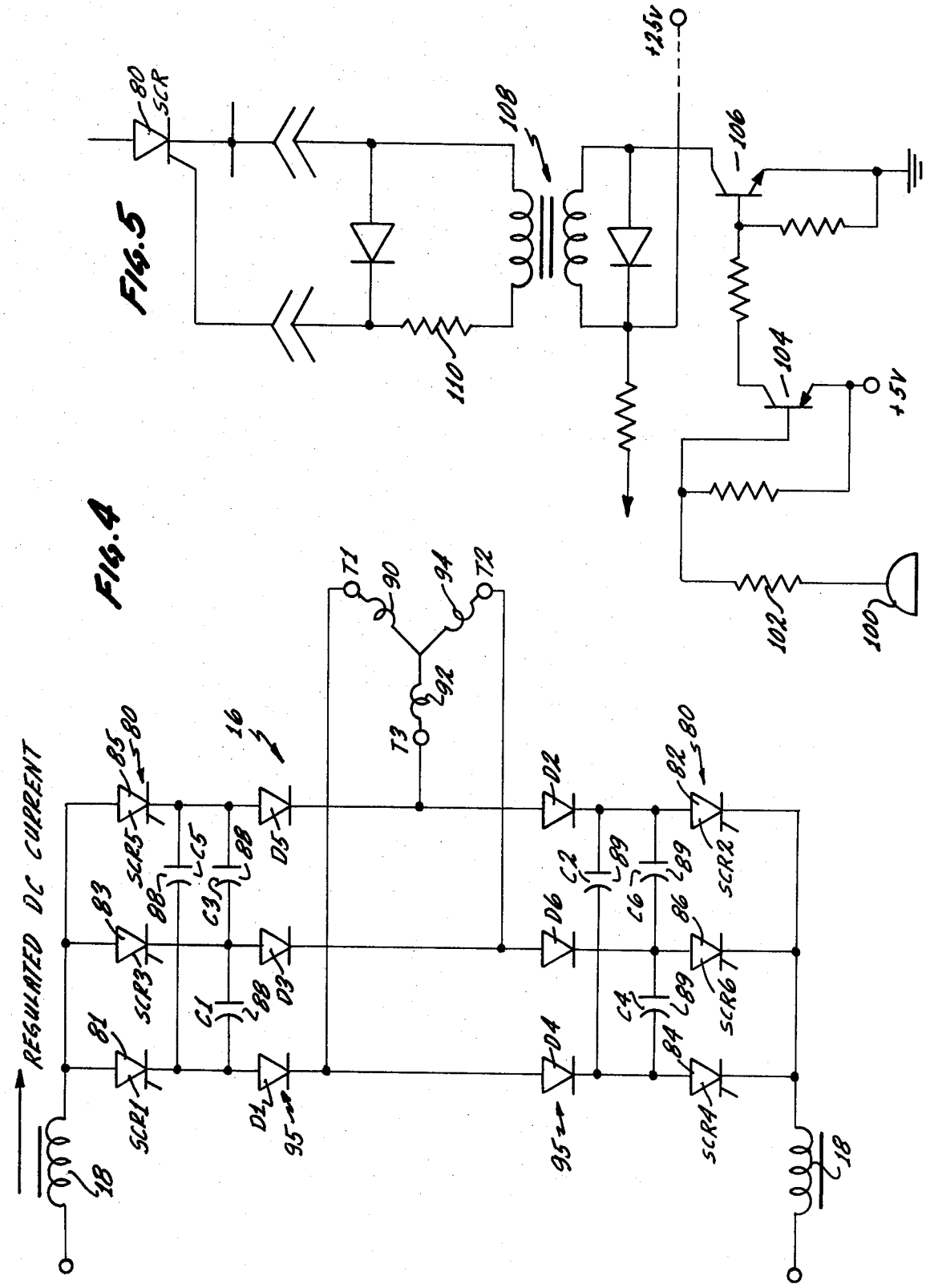

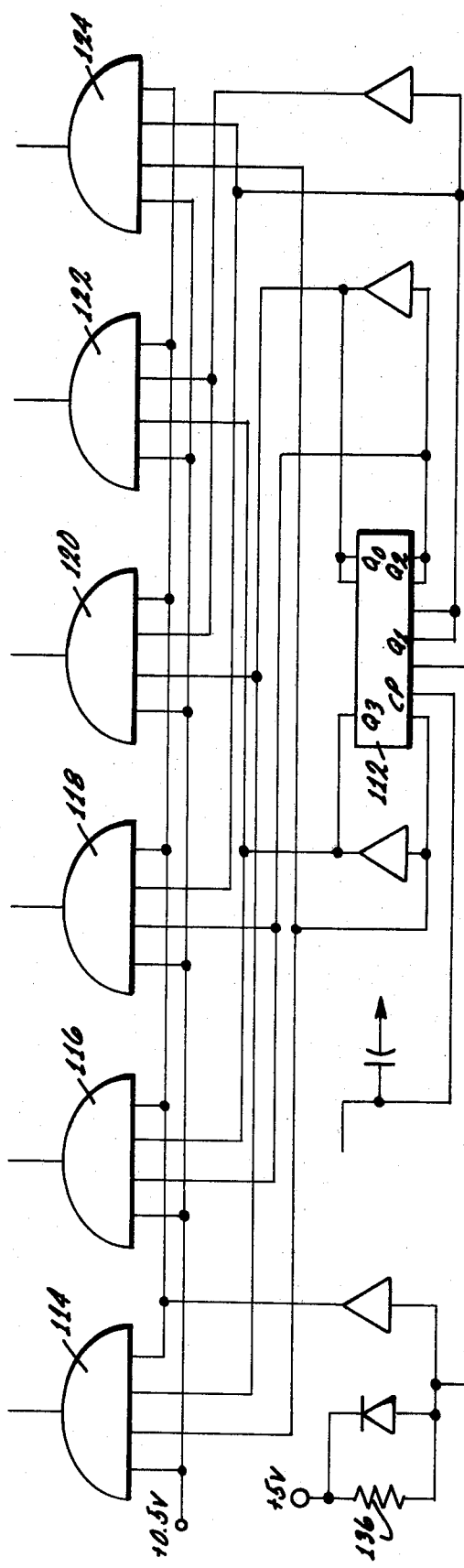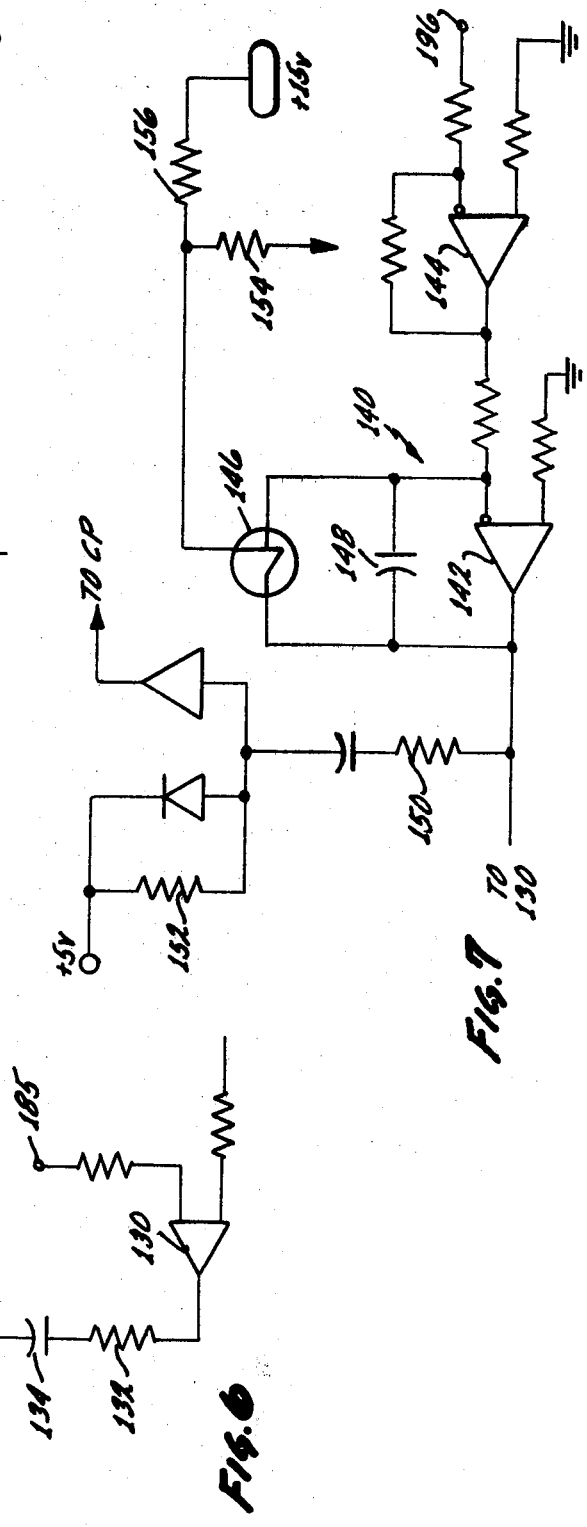
Fig. 6
Fig. 7

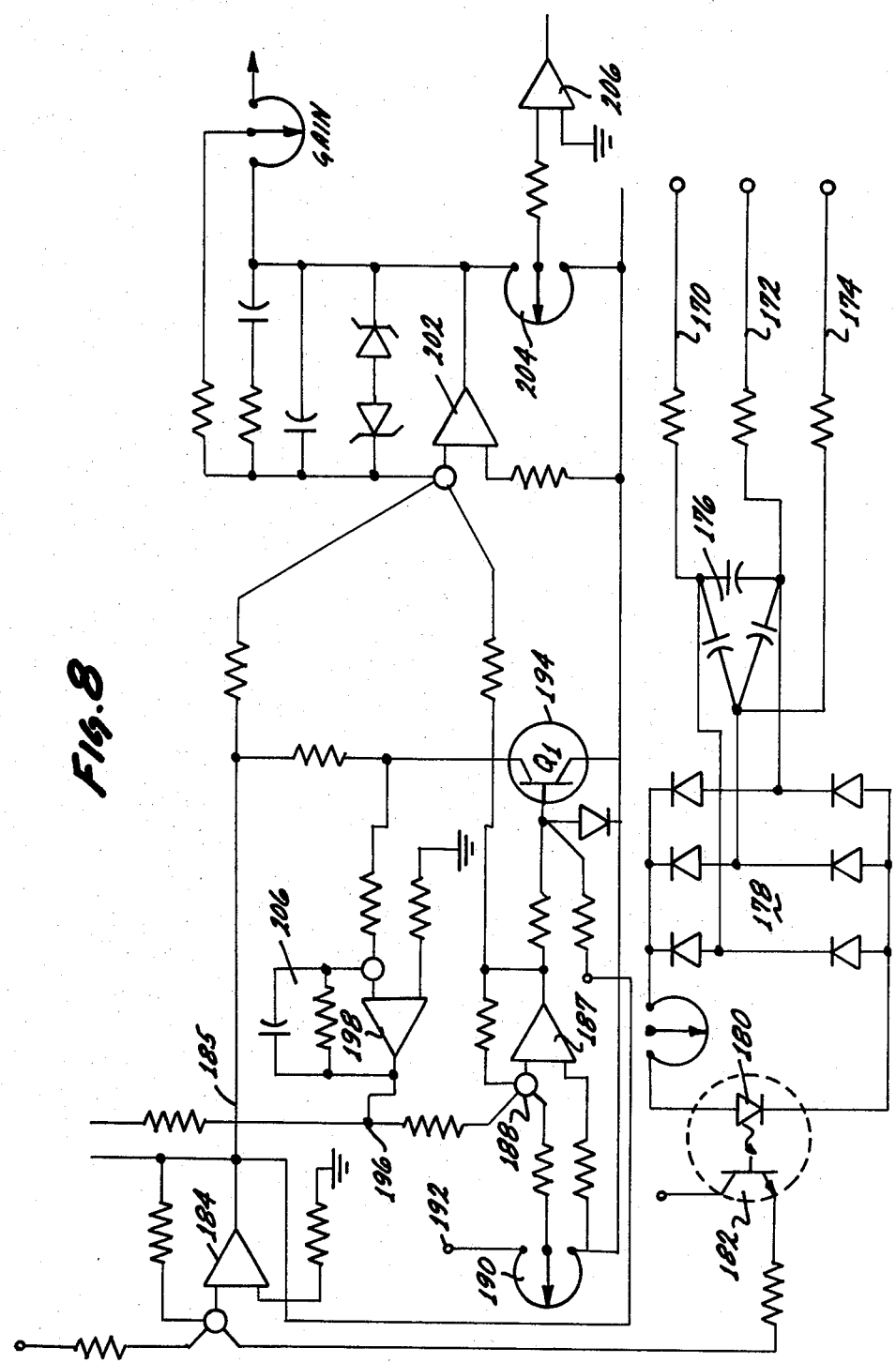

VARIABLE SPEED CONTROLLER WITH IMPROVED EFFICIENCY OF ENERGY TRANSFER FOR AN AC INDUCTION MOTOR

BACKGROUND OF THE INVENTION

1. Field of the Invention

The present invention relates to the art of controlling current and power to alternating current induction motors, and more particularly relates to the control of the firing sequence of the stator pole coil for minimizing linkage power differences, and for maximizing the flux linkage between the coils of the stator and the rotor to maximize energy efficiency.

2. Description of the Prior Art

In the past, alternating current (AC) induction motors were constructed having a plurality of poles arranged in a circumference on the stator around a corresponding plurality of poles arranged on a rotor. As the coils of the poles of the stator have their corresponding electromagnetic fluxes changed by a change of the current in the coil, the attractive and repulsive forces against the sympathetic poles of the rotor force the rotor to move. When the change in the electromagnetic flux polarity of the stator poles changes sequentially, in the circumferential or peripheral direction, the rotor rotates in the desired direction. Obviously, the timing of the current change in the coils is important to maintain the momentum, acceleration or deceleration of the rotor's rotation. AC induction motors have used for such timing a source of clocking pulses and an oscillator generating a firing frequency or pulse train.

In the past, the frequency generated by the oscillator maintained a constant phase and was used as the basis of the clock. The frequency thus served as an immutable reference in the system. The unchanging nature of the generated frequency, however, does not help maintain the maximum efficiency between the stator and the rotor as the speed is increased or decreased. As the frequency is decreased in order to decrease speed of rotation, the firing sequence of systems of the past, is maintained at the clock frequency. The decreased frequency then places an increased load on the flux linkage and on the stator coils as the rotor slips behind in the flux linkage scheme.

This increased load creates an inefficiency in the energy supplied-to-energy derived ratio. There is a power reduction in the rotor's output which is not seen comparatively in the electrical power input.

SUMMARY

In brief, in accordance with one aspect of the present invention, electrical power energy for a three-phase alternating current (AC) induction motor is rectified and timed from commercial 60 Hertz (Hz) power. The three phase power is rectified through a bridge of silicon controlled rectifiers (SCRs) whose firing is timed by a firing circuit. The rectified power is transmitted through filters to a current mode invertor comprising a bridge of silicon controlled rectifiers, whose firing time is determined by an independent firing and gating circuit.

The firing of the SCRs for the controlled rectifying bridge is derived from coils cross-wound with the input power, and delivered to a timing circuit using a Norton operation amplifier. A bank of six such timing circuits are arranged to fire two SCRs at any one time. A single leg of the input power coils will provide power to two such timing circuits. Each input power coil is arranged as an auto transformer, and the operational amplifier has a capacitor in parrallel to receive a charge and to discharge during half cycles of the input power across the coil.

A signal proportional to the voltage signals at the stator terminals is summed with a fixed current to produce a current error signal which is compared with the output signal of the timing circuit. The output of the comparator is shaped by a monostable flip-flop in the present application into a pulse having a defined amplitude and time duration. This pulse is amplified and passed through a transformer, and is used as the firing pulse at the firing node of the appropriate SCR. The transformer isolates the firing signal from the timing circuitry.

A logic scheme is employed between the monostable flip-flops and the amplifiers so that each output pulse from the flip-flop is repeated approximately 60° after the pulse, to accomplish a double pulse firing sequence at each SCR gate. The double pulsing insures a constant current regulation where one-third of the total power in the overall cycle of power must come from each of the three-phase line inputs.

In the controlled rectifying bridge, a greater power input through one SCR cuts off the adjacent, conducting SCR in the line having the greater power. It is necessary, however, for each line to provide approximately one-third of the total power from the power source, and that each independent line conduct for 120° of the 360° power cycle. In the power cycle, however, an adjacent line will have a greater power conductance over the conducting line 60° after initial firing. In order to maintain the conducting line in a conducting state for a full 120° time duration, a second firing pulse re-firing the conducting firing SCR is required.

The firing of the stator terminals is controlled by a bridge of SCRs whose gating is controlled by a frequency generator or oscillator having a phase redetermined in accordance with changed conditions in the motor as determined by stator terminal voltage. The signal proportional to the stator terminal voltages is used as a modification to a speed or frequency reference for driving an oscillator to produce the ramp type, saw tooth frequency output. The oscillator output is used as a clock for a shift register. The signal driving the oscillator has a certain time lag at or prior to the summing of the reference frequency and the signal proportional to the stator terminal feedback signal. The comparator compares the stator terminal feedback proportional signal directly with the output of the oscillator to develop an output signal having a phase shifted by the difference between the two, to develop a new firing impulse point or phase of the firing pulses.

These firing pulses are seen as an input to the decoding logic for developing a signal at the firing gates of the inverter SCRs. The signal from the decoding logic is amplified and buffered through an amplifier and transformer for each of the inverter SCRs, all arranged in parallel. The transformer isolates the signal at the SCR firing gate from the firing circuitry.

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is a block schematic diagram showing the environment of the present invention;

FIG. 2 is an electrical schematic diagram of the major elements of the controlled rectifier of FIG. 1;

FIG. 4 is a simplified electrical circuit diagram of the inverter of FIG. 1;

FIG. 5 is an electrical circuit diagram of a gating signal amplifier for the firing circuits of FIG. 4;

FIG. 6 is an electrical schematic diagram of the comparator, inverter gating and logic circuits for the firing pulses of the inverter circuit of FIG. 4;

FIG. 7 is an electrical schematic diagram of the oscillator and clock circuits of the SCR firing circuits of FIG. 4; and FIG. 8 is an electrical schematic of a signal condition circuit for modifying the firing circuits of FIG. 4.

Figure 3:
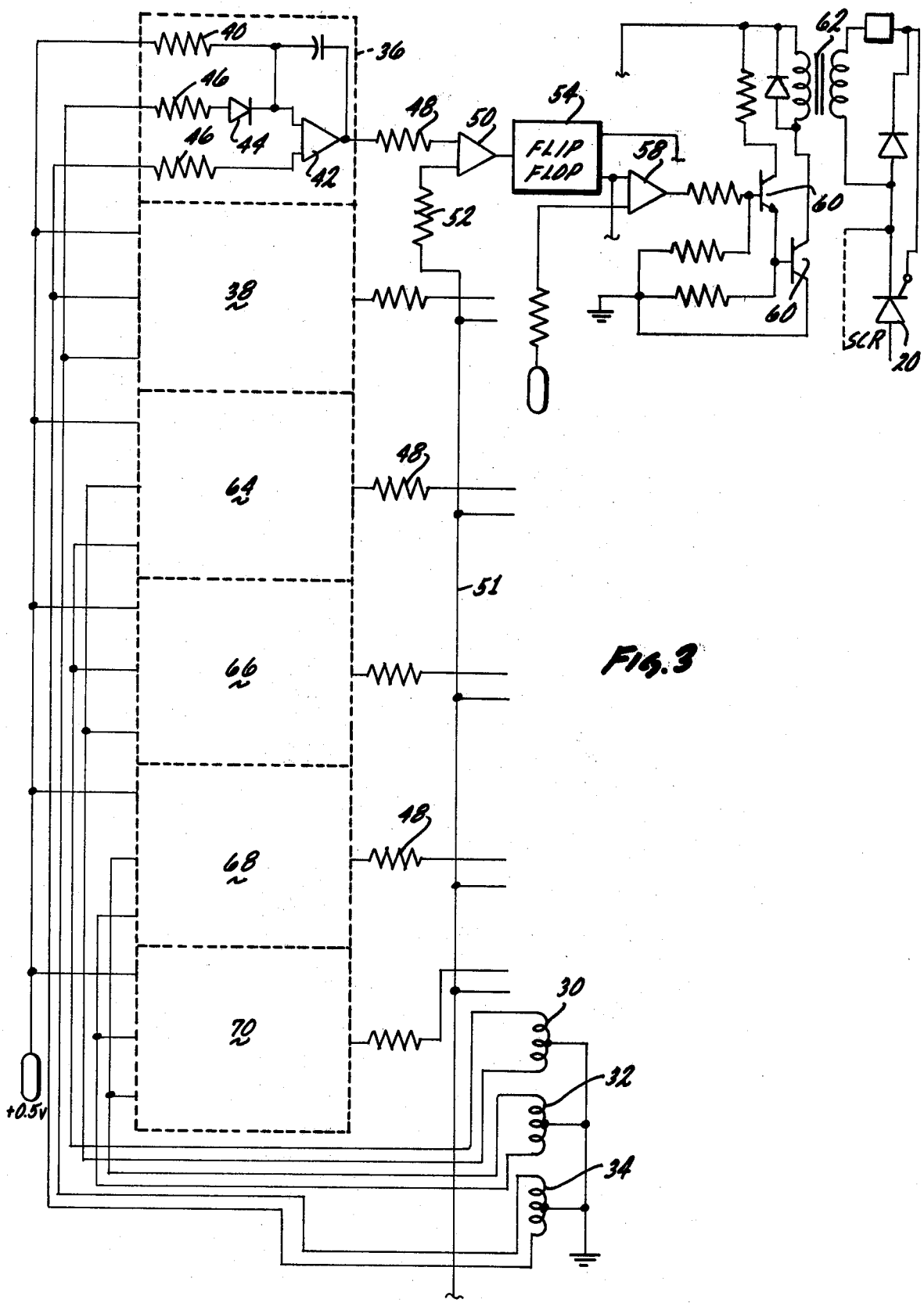
FIG. 3 is a partial electrical circuit diagram of the firing circuit for the elements of FIG. 2.

In the present invention, reference being had initially to FIG. 1, a three-phase AC induction motor 10 is powered by commercially available, 60 Hz power in three phases through polyphase power lines 12, 13, 14. The power is rectified by control rectifier 15, with speed or frequency developed in accordance with the present invention in the current mode inverter 16. Filter chokes 18 are interposed between the rectifier 15 and the inverter 16 to isolate the developed frequencies from the power supply.

The controlled rectifier 15 comprises a bridge network of six silicon controlled rectifiers (SCRs) collectively referenced 20 shown in simplified schematic in FIG. 2. In FIG. 2, the SCRs 20 are numbered 1 through 6 in order to simplify description. Power from line 12 is delivered to the filter 18 through SCR 1 21, and during the negative half of the cycle is delivered back to line 12 through SCR 4 24. Similarly, power through line 13 is delivered to the filter 18 through SCR 3 23, and during the negative half of the cycle is returned to line 13 through SCR 6 26. In like manner, power from line 14 during the positive half of the power cycle is delivered to filter 18 through SCR 5 25, and returned to line 14 in the negative half of the cycle through SCR 2 22.

The "on" times of the SCRs 20 are determined by a gating signal which in part is a function of a current regulating signal developed by the present control system.

In FIG. 3, a series of similar gating signal circuits are shown, each circuit developing a gating signal for one of the SCRs 20. The timing of the gating signal is developed from an autotransformer 34 receiving a proportional amount of current and power from one line of the polyphase power source. The power for the timing circuits 36 and 38 are derived from the transformer 34. The timing circuits 64, 66, 68 and 70 for the remaining four SCRs are identical to timing circuits 36 and 38, and derive their power from respectively, transformers 30, 32 which are coupled to corresponding remaining legs of the polyphase power source.

In the timing circuit 36, a biased resistor 40 biases the Norton operational amplifier 42 output to a 0.5 volt level. Diode 44 isolates this bias power from the power derived from transformer 34. Resistors 46 control the current going into the amplifier 42. The output signal of the timing circuit 36 will therefore be a function of the status of the phase in transformer 35, which derives its power by electromagnetic coupling to one leg of the polyphase power input.

The output signal of circuit 36 is coupled through resistor 48 to comparator gate 50. The other input to comparator 50 is a signal in line 51 from a current regulating circuit through resistor 52, the development of which signal will be described in greater detail below.

The output signal from comparator 50 is sent through a monostable flip-flop 54 where the signal, comprising a pulse, is shaped particularly for driving decoding logic for synchronizing the firing of the SCRs 20 as well as providing a signal to a gating amplifier 58. The typical output of the monostable flip-flop 54 comprises a fixed 50 microsecond pulse of approximately 15 volts amplitude. The output of amplifier 58 switches tandem connected emitter transistors 60 into a conducting state, placing a current in the transformer 62. The signal from the transformer 62 comprises the firing or gating signal, switching SCR 20 into a "on" state. The transformer 62 isolates the time sequence decoding logic from the SCR 20 and thus isolates the control from the power circuit.

Each of the remaining timing circuits 38, 64, 66, 68 and 70, are identical to the timing circuit 36. Further, the output signal from each of the timing circuits is connected through a comparator, a monostable flip-flop and a gating signal amplifier for switching its corresponding SCR "on" at the appropriate time. Each timing circuit 38, 64, 66, 68 and 70 is connected to a specific one of the transformers 30, 32, 34 so that the timing will correspond to the power input in the corresponding leg of the polyphase power source. The flip-flops are selectively interconnected so that pulses from two or more flip-flops are not generated simultaneously. A detailed description of these individual circuits, therefore, will not be given, since it is considered that those skilled in the art will readily appreciate the similarity and the identity of functions of each respective SCR gating and firing circuit.

In FIG. 4, a simplified schematic of the current inverter 16 is shown. The current established by the controlled rectifier 15 is received through filters 18 at the bridge comprised of SCRs, here collectively referenced 80, through the motor represented by the windings 90, 92, 94. Each of the SCRs 81, 83, 85 have their outputs interconnected by capacitors 88. Similarly, the inputs to SCRs 82, 84, 86 are interconnected by capacitors 89. The capacitors 88, 89 serve to back bias adjacent SCRs 80, to cut them "off", while the diodes 95 protect the SCRs 80 from long surges and the like.

Thus, in the firing cycle, SCR 3 83 is cut "on" immediately after SCR 1 81 is to cease conducting. When SCR 3 83 is gated "on", the capacitor c1 88 between SCR 1 81 and SCR 3 83 is positively biased on the side facing SCR 1 81. This capacitance establishes a back bias, cutting SCR 1 81 "off". Remaining charge on the capacitor c1 88 is discharged through the diode 95 between SCR 1 81 and pole 90 until the capacitor c1 88 is charged in the opposite direction by the current through SCR 3 83. When the capacitor c1 88 has so charged, the current then flows through SCR 3 83, through the pole 94 in the motor and onto the destination according to the gating scheme of SCRs 84, 86 and 82.

The gating signals for the individual SCRs 80 in the current invertor 16 are developed across a gating signal amplifier and isolated from the firing sequence circuitry by individual transformers in a manner similar to the isolation of the SCR gating signals in the controlled rectifier 15. In FIG. 5, a representative one of the gating amplifier circuits for producing an SCR firing signal for a representative SCR 80 is shown. The logic gate 100 produces the timed signal through resistance 102 to cut "on" transistor 104, in turn switching "on" transistor 106, to draw join current through the logic side of transformer 108. A sympathetic signal is produced through resistor 110 connected directly to the gating node of SCR 80.

In FIG. 6, the logic gates 114, 116, 118, 120, 122, 124 are shown connected to a shift register 112. Gates 114, 116, 118, 120, 122 and 124 have one input each connected to a positive voltage source which can be used to inhibit or to stop SCR gating. The remaining inputs to the logic gates, which comprise NAND gates, are from the gating pulse and from the shift register 112. Shift register 112 is a shift right, parallel entry type shift register commonly available on integrated shifts, in which a clock pulse at the CP input cumulatively shifts a positive output from the $Q_0$ output, shifting upon each input to the next succeeding $Q_1$, $Q_2$, etc. outputs.

As is indicated in FIG. 6, an input at CP initially will result in an output at $Q_0$ causing an output signal to logic gates 114, 120. The next pulse will cause an output at $Q_1$ which sends a pulse to the inputs of logic gates 118 and 124. The next pulse brings an output from $Q_2$ which sends a logic signal to logic gates 116, 118. The next pulse causes an output from output $Q_3$ to logic gates 116, 122. The clock pulses are derived from the frequency oscillator or generator, as will be explained in greater detail below.

In FIG. 6, further, it can be seen that each of the logic gates 114, 116, 118, 120, 122, 124 has as an input, a signal from the gating circuit. When comparator gate 130 changes its state, a signal is produced at each NAND gate through resistance 132, capacitance 134 and hex inverter 136.

In FIG. 7, an oscillator 140 is shown. The oscillator 140 receives an input signal to amplifier 142 from amplifier 144, which receives its input from a signal conditioning circuit that will be explained in greater detail below. A P.U.T. type voltage control switch 146 closes to discharge capacitor 148, while amplifier 142 serves as a buffer between the input and output signals. The trip voltage of the P.U.T. is fixed by the voltage division made by resistors 154 and 156. The charging time of capacitor 148 is determined by the output of amplifier 144.

The output of amplifier 142 then comprises the clock pulse directed to the input CP of shift register 112, and one of the inputs to comparator 130. The output of amplifier 142 comprises a ramp type saw tooth wave which is shaped by the RC circuit 150 and a hex inverter amplifier 152 to result in 20 microsecond, five volt amplitude pulses to the shift register 112.

In FIG. 8, a feedback circuit illustrating the development of a correction signal for the frequency generator or oscillator is shown. The voltage from each of the three lines of the stator terminals, 170, 172, 174 are directed through a diode bridge 178. A single output voltage signal is developed across light emitting diode 180 to photocollector emitter transistor 182. Transistor 182 provides the isolation for the signal that will be conditioned or used from the signals developed directly from the stator terminals. The signal from transistor 182 is then amplified in amplifier 184 to produce as an output a signal proportional to the sum of the signals from the stator terminal.

A frequency reference voltage is established at node 188 by adjusting potentiometer 190 connected to a negative potential 192. The negative potential at node 188 establishes the cut-off or gating voltage at transistor 194. As the signal from amplifier 184, which is proportional to the sum of the signals fed back from the stator terminals 170, 172, 174, is developed at line 185, the transistor 194 is made conductive. The signal at line 196 differs from the signal at the output of amplifier 184 by amplification in amplifier 198 having an RC circuit 200 connected in parallel with the amplifier's output and feedback signal input. The positive signal output of amplifier 198 is added to the reference signal at node 188 to produce the correction signal comprising the input to amplifier 144 in FIG. 7.

The output of amplifier 184 produces at line 185 a signal proportional to the cumulative input signals from the stator terminals 170, 172, 174. This output is seen as the input to amplifier 202, which is connected across a double Zener diode by-pass and RC circuit for shaping the output. The output of amplifier 202 can be limited through potentiometer 204 and amplified through amplifier 206. The output of amplifier 206 is used as the signal for comparison with the output of the timing circuits 36, 38, 64, 66, 68, 70 in the comparators 50 in the firing circuit scheme of FIG. 3.

The signal proportional to the stator terminal inputs indirectly affects the other input to amplifier 202, as well as comprising one of the control signals for the ramp oscillator 144 and the inverter amplifier 187. The stator terminal input signal resulting from amplifier 184 is amplified in amp 198. The resulting error signal at node 196 is referenced by the potentiometer 190 which is biased at source 192 to control the effects of the error signal 196. The error signal 196 thus referenced comprises an input to amplifier 144 which produces the oscillator signal as explained above.

The signal at input 188 to amplifier 187 likewise comprises the difference between the desired speed or reference signal as set by the normally negative potential from potentiometer 190, and the error signal 196. The operation of inverter amp 187 controls the operation of transistor Q1 194. Transistor Q1 in effect creates a voltage which is a fraction of the stator terminal voltage in this feedback loop.

The output of amplifier 184, in addition, comprises the second input to comparator 130 (FIG. 6) for gating the logic gates 114, 116, 118, 120, 122, 124. Normally, the output of amplifier 184 is negative when the signal proportional to the cumulative signals from the stator terminals indicates a change or adjustment to be made to the moment of the firing pulse. The signal from amplifier 184, after some amplification not shown, is compared with the output of amplifier 142 (FIG. 7) in the comparator 130 which serves to operate the time windows for the logic gates. Thus, the comparator 130 compares the signal proportional to the cumulative input signals from the stator terminals 170, 172, 174, with the ramp oscillator signal of FIG. 7.

The reference voltage can be established, therefore, by the reference setting potentiometer 190, and changes as indicated from the cumulative signal from the stator terminals 170, 172, 174, adjust the reference voltage at the input to the ramp oscillator generator 142, to comparator 130, to current control amplifiers 204, 206 and to the transistor Q1 194.

It can be seen that by regulating the firing circuit scheme for the controlled rectifier by the gating signal directly dependent upon the motor voltage as seen from the stator terminals 170, 172, 174, the firing of the SCRs 20 in the controlled rectifier 15 will be delayed or accelerated in direct dependence upon the motor voltage. The motor voltage increases as the slippage decreases, or decreases as the slippage increases. By accelerating or decreasing the firing time of the SCRs 20 in the bridge 15 of the controlled rectifier, the current passing through the controlled rectifier to the polyphase motor is increased as the slippage increases, or is decreased as the slippage decreases to maintain an efficient supply of current to the motor in accordance with motor load demands. Furthermore, by use of the present invention it is seen that the phase of the firing pulses for the SCRs 20 in the inverter circuit is constantly readjusted to be in direct syncronism with the phase of the current going through the controlled rectifiers 80 to the motor. Thus, this circuit eliminates the power loss necessarily attendant in conventional motors.

The foregoing detailed description is illustrative of several embodiments of the invention. It is to be understood, however, that additional embodiments will be perceived by those skilled in the art. The embodiments described herein, together with those additional embodiments are considered to be within the scope of the present invention, which should be limited solely by the appended claims.

I claim:

1. A control for establishing the timing of firing pulses and for establishing the timing of clock pulses for an AC induction motor having a rotor and a stator electromagnetically interconnected by magnetic flux created by electric fields generated by coils of electrically conductive material having terminals through which electrical energy is transmitted thereto, said coils being positioned on said rotor, and on said stator in juxtaposition with corresponding coils in said rotor for alternating excitation relative thereto to cause rotation of the rotor relative to the stator, said coils on said stator receiving electrical energy through coiled terminals therein; said induction motor further having a constant frequency clock pulse generator for generating a pulse signal at a given frequency, comprising:

a. signal generating means connected to said stator coil terminals and receiving signals from said stator coil terminals, for resetting the time of exciting the beginning moment of said clock pulses and of firing pulses dependant thereon;

b. first means within said conditioning means connected to said stator coil terminals and receiving rectified alternating current signals from said stator coil terminals, said means for consolidating said received signals and producing a single output proportioned to the received signals and including a photocell detector producing as an output said single signal output proportioned to the received signals, and receiving as an input a light from a light emitting diode excited by said consolidated received signals;

c. second means within said conditioning means connected to receive the output signal of said first means, for comparing said signal with a reference limit of opposite polarity, and producing as an output a current regulating signal when the signal proportional to the alternating rectified signal varies from the limit by which the comparator compares;

d. third means within said conditioning means connected to receive said signal proportional to the rectified alternating current signal, said third means including a resistance-capacitance circuit element for generating as an output a ramp type sawtooth signal for use as clock pulses which are a function of the average magnetomotor force reflected to the stator;

e. comparator means within said conditioning means connected to receive said signal proportional to the rectified, alternating current signal from the stator terminals and comparing it with the output of the ramp generator, producing as an output a train of periodic pulses for firing current in the coils creating said electric field in said stator coils, and for changing the period between one firing pulse and the next succeeding firing pulse when said signal proportional to the rectified, alternating current signal from the stator terminals has an amplitude less than the amplitude of the sawtooth wave produced by the ramp generator.

* * * * *